March 3, 1959

A. K. SIMONS ET AL 2,875,810

RESILIENT SEAT STRUCTURE

Filed Dec. 6, 1956

INVENTORS.
Allison K. Simons
Arthur O. Radke
Joseph A. Champa
by Popp and Sommer
ATTORNEYS.

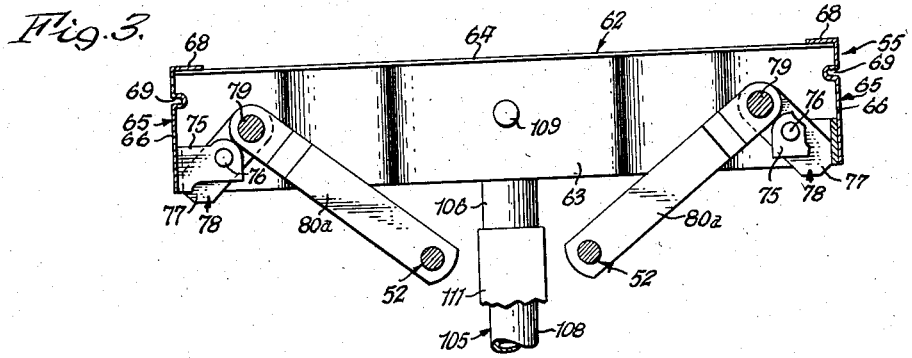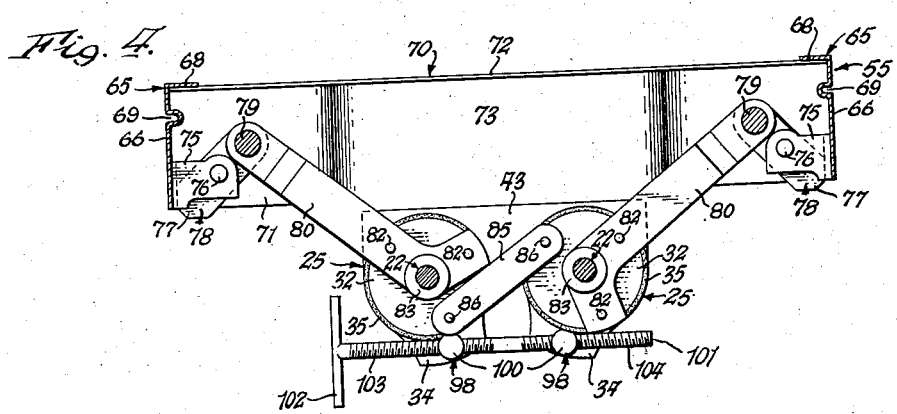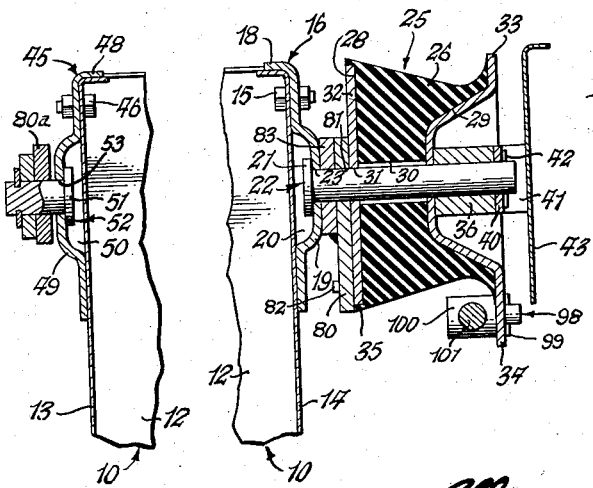

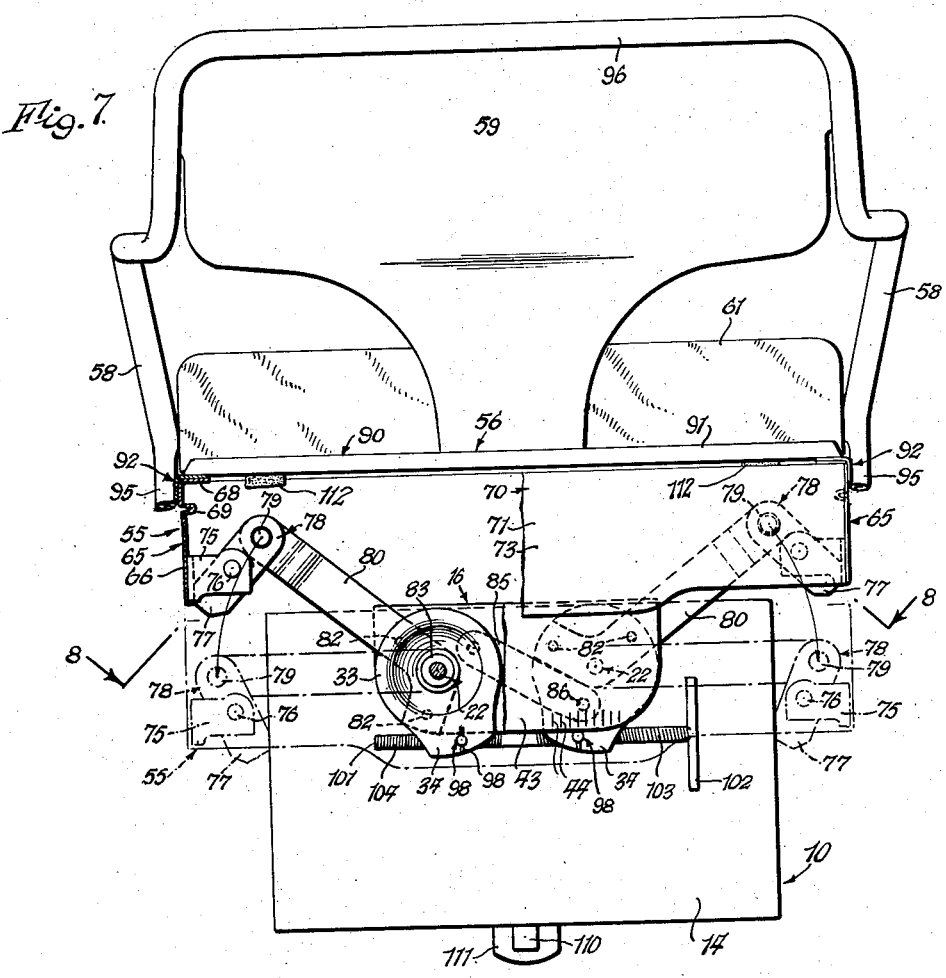

March 3, 1959  A. K. SIMONS ET AL  2,875,810
RESILIENT SEAT STRUCTURE
Filed Dec. 6, 1956  4 Sheets-Sheet 4

INVENTORS.
Allison K. Simons
Arthur O. Radke
Joseph A. Champa
by Popp and Sommer
ATTORNEYS.

United States Patent Office 2,875,810
Patented Mar. 3, 1959

2,875,810

RESILIENT SEAT STRUCTURE

Allison K. Simons, Whitefish Bay, Arthur O. Radke, Wauwatosa, and Joseph A. Champa, Milwaukee, Wis., assignors to Hickman Industries, Inc., Eden, N. Y., a corporation of New York Application December 6, 1956, Serial No. 626,669

1 Claim. (Cl. 155—50)

This invention relates to a resilient seat structure and more particularly to a seat structure designed for use with extremely rough riding vehicles, such as farm tractors and military vehicles, the seat being particularly applicable where the occupant must be seated directly over a large battery or tool box.

Important generally objects of the present invention are to provide a seat structure (1) in which the seat part is permitted to move vertically against a geometric resilient resistance relative to the vehicle on which the seat is mounted; (2) in which a degree of resiliently resisted movement of the seat laterally of the vehicle frame is permitted; (3) which provides the maximum safety and comfort and leaves the occupant in full control of all of the vehicle controls; (4) in which the seat moves with the occupant and is not drawn or jerked away from the occupant whenever the pressure imposed by the occupant upon the seat becomes negative; (5) which will operate at a desirable frequency range regardless of the weight of the occupant; (6) which can be designed, within practical limits, to have any desired frequency and any desired resistance curve; (7) which reduces and cushions vertical and lateral impacts against the occupant without imposing undue thrusts on the connections between the seat part of the seat structure and the vehicle; (8) in which torsion springs are employed to provide a longer and variable spring resistance range; (9) in which the resilient support is provided by torsion springs which are simple, compact, low in cost and have long life and freedom from service difficulties; (10) in which geometric resilient resistance is obtained in a very compact structure which requires very infrequent lubrication and is free from noise; (11) in which the load from the seat part to the suspension means and from the suspension means to the base part of the seat structure is distributed at a plurality of widely spaced points; (12) in which both fore-and-aft and lateral tilting of the seat is prevented; (13) which is made of a plurality of low cost and sturdy sub-assemblies which can be easily coupled together; and (14) which is extremely compact and sturdy and which will stand up under conditions of severe and constant use with very little servicing.

A specific object of the present invention is to provide such a seat structure which can be mounted directly over a relatively large battery box or tool box, the case of which serves as the base part of the seat structure.

Another specific object is to provide such a seat mounted over such a battery box or tool box which is limited with respect to the permitted vertical movement of the seat part and in which it is necessary that the seat part encompass the battery or tool box in itse vertical movement.

Another specific object of the present invention is to avoid interference with accessability to the battery box or tool box by any part of the suspension means between the seat part of the seat structure and the casing of the box.

Another object is to provide such a seat structure in which full access to the top of the battery or tool box is had by the mere removal of the seat cushion.

Another specific object of the present invention is to avoid any danger of getting one's fingers pinched between moving members, particularly between the seat part and the casing of the box which forms the base part or between either of these parts and the suspension means.

Another specific object of the present invention is to provide such a seat structure which is readily accessible for adjustment, particularly adjustment to suit the weight of the occupant.

Another specific object of the present invention is to provide such a seat structure which is both low in cost, considering the function which it performs, and is attractive in appearance.

Other objects and advantages of the invention will be apparent from the following description and drawings in which:

Fig. 1 is an exploded side elevational view of the several major parts of a seat structure embodying the present invention, such major parts being the seat structure, including the base part and a subframe of a seat part; an adjustable top frame of the seat part and providing the arms and back; and a removable seat cushion the removal of which provides full acces to the top of the battery or tool box.

Figs. 3 and 4 are enlarged fragmentary vertical sections taken generally on the correspondingly numbered lines of Fig. 1.

Fig. 5 is an enlarged fragmentary vertical section taken generally on line 5—5, Fig. 10.

Fig. 6 is an enlarged fragmentary vertical section taken generally on line 6—6, Fig. 10.

Fig. 7 is a rear elevational view, with parts broken away, of a seat structure embodying the invention and showing, in full lines, the position of the parts when the seat structure is unoccupied and fully elevated and showing, in dot-dash lines, the position of the parts under maximum static and dynamic load.

Fig. 8 is a fragmentary sectional view taken generally on line 8—8, Fig. 7.

Figure 1:
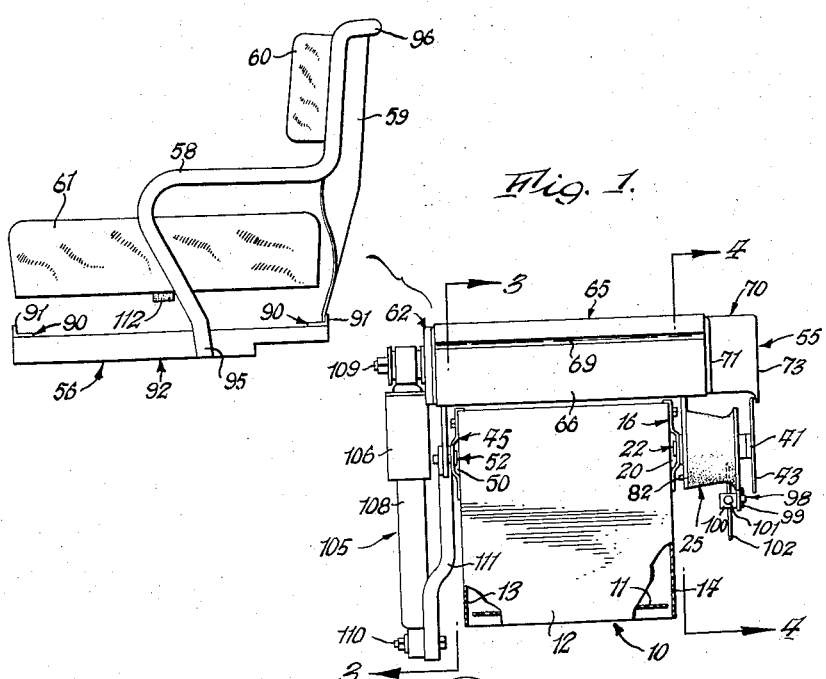
Figure 2:
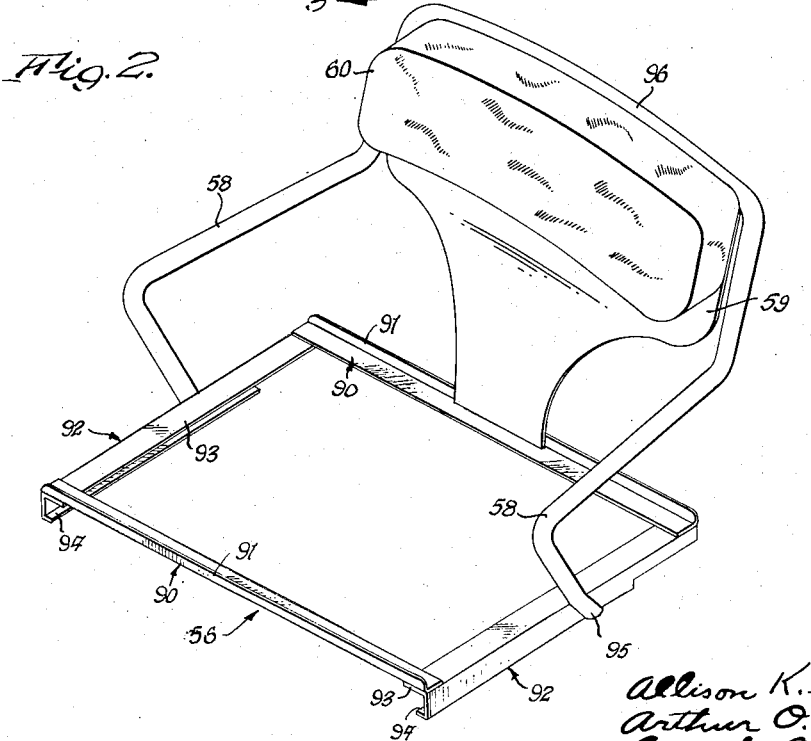
Fig. 2 is a perspective view of one of these major parts, namely the adjustable top frame which provides the back and arms of the seat structure.
Figure 9:
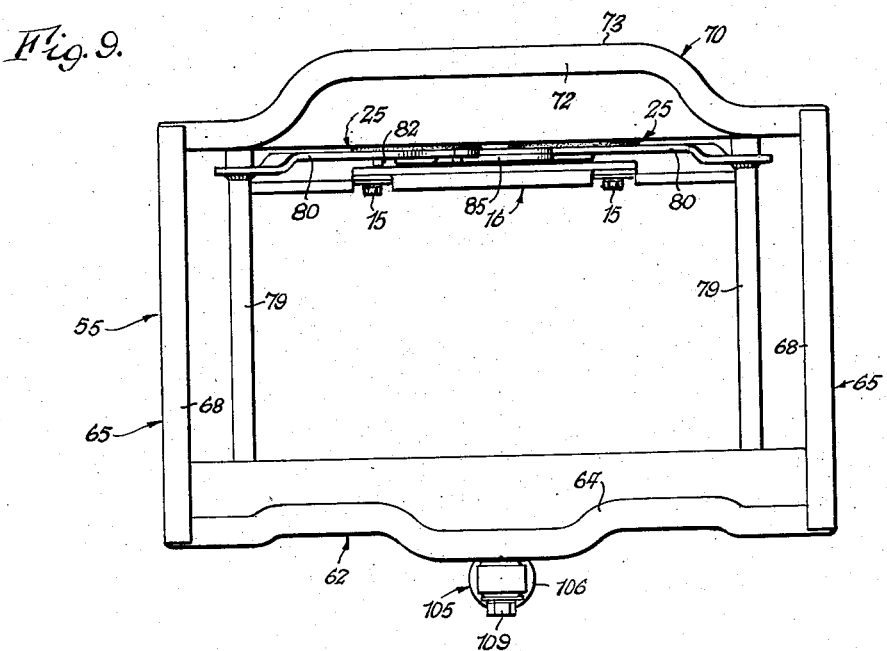
Fig. 9 is a top plan view of the seat structure with the seat cushion and top frame removed.
Figure 10:
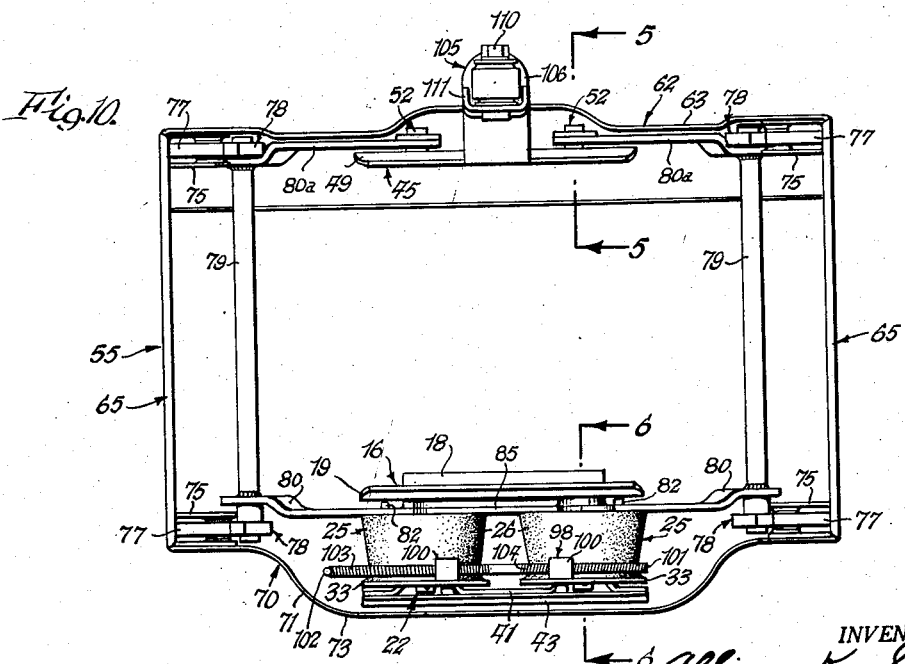
Fig. 10 is a bottom view with the battery or tool box removed.

The seat structure embodying the present invention is particularly designed for use where rough riding or extreme vertical and lateral impact conditions are encountered, such as in farm tractors, and where the occupant must be seated directly over the casing 10 of a battery or tool box. This battery or tool box 10 is shown as being made of metal and as having a bottom wall 11, side walls 12 and front and rear walls 13, 14, respectively. The top of the box or casing 10 is open for insertion and removal of electric storage batteries or tools (not shown).

Secured, as by a pair of bolts 15, centrally to the rear face of the rear wall 14 of the battery box or casing 10 is a rear mounting plate 16 for the seat suspension means, this mounting plate having along its upper edge a flange 18 extending over the rear wall 14. Along its horizontal center line this mounting plate is provided with a rearwardly offset rib or corrugation 19 providing a space 20 for the heads 21 of a pair of horizontally spaced horizontal pins 22 which extend rearwardly through holes 23 provided in the rib or corrugation 19, as best shown in Fig. 6.

On each of these pins 22 is mounted a rubber torsion spring indicated generally at 25 and which forms the resilient support for the suspension means. Each of these rubber torsion springs 25 can be of any suitable construction and is shown as comprising a frusto-conical body 26 of rubber having a flat forward face 28 and a concave rear face 29. Each rubber body 26 has a coaxial bore 30 which is of larger diameter than the companion pin 22 which extends through this bore. The pin also extends through an opening 31 in a metal disk 32 which is vulcanized to the flat front face 28 of the rubber body 26. To the opposite concave face 29 of each rubber body 26 is vulcanized a conforming convex metal anchoring member or plate 33, this anchoring member or plate having an outwardly projecting marginal flange 34 which projects downwardly. For protection, the outer edge of each rubber body 26 preferably curls around and is vulcanized to the edge of the disk 32 as indicated at 35.

A spacing sleeve 36 is provided on each pin 22 within the concavity of each anchoring plate 33 and against the rear end of these spacing sleeves 36 is arranged the forward offset 40 of a cross bar 41. A drive pin 42 extending through the rear extremity of each pin 22 maintains the parts in position on the pin 22 and, as best shown in Fig. 8, the cross bar 41 connects the rear ends of the two pins 22 and holds them against horizontal movement with respect to each other. To this cross bar 41 can be welded a sheet metal plate 43 which serves both to conceal the rubber springs from the rear and also is preferably calibrated, as indicated at 44, to provide a scale which permits the seat structure to be adjusted to suit different weights of occupants as hereinafter described.

A front mounting plate 45 is secured, as by a pair of bolts 46, centrally to the forward face of the front wall 13 of the box or casing 10, this mounting plate having an upper flange 48 extending rearwardly over the top of this front wall. This mounting plate 45 is provided with a horizontal central forwardly projecting rib or corrugation 49 which forms a space 50 for the heads 51 of a pair of pins 52, the shanks of which extend forwardly through holes 53 provided in the forwardly extending rib or corrugation 49 of the mounting plate 45, as best shown in Fig. 5. These pins 52 are, respectively, in axial alinement with the pins 22 at the rear of the seat structure and serve as the base pivot pins for the front crank arms, as hereinafter described.

The seat part of the seating structure comprises three major assemblies namely, a rectangular subframe indicated generally at 55; a rectangular top frame 56 on which the arms 58, back plate 59 and back cushion 60 are mounted; and a rectangular seat cushion 61 which is liftable from the top frame 56 to permit direct access to the battery or tools contained within the box 10.

The rectangular subframe 55 of the seat part of the seat structure comprises a front cross bar 62 which is L-shaped in cross section, having a deep vertical flange or web 63 and an upper rearwardly projecting relatively narrow horizontal flange 64. This front cross bar 62 is arranged slightly in advance of the front wall 13 of the box 10 and extends a short distance beyond the end walls 12 thereof. Welded to the opposite ends of this front cross bar 62 are the forward ends of the side bars 65. Each of these side bars is L-shaped in cross section, having a deep vertical flange or web 66 and a horizontal inwardly projecting relatively narrow top flange 68. Each side bar 65 can be strengthened by the provision of a longitudinal corrugation or bead near its upper edge and which provides an external track groove 69 for the top frame 56 as hereinafter described. The subframe of the seat part is completed by a rear cross bar 70 which is L-shaped in cross section, having a deep vertical flange or web 71 and a forward extending relatively narrow top flange 72. This rear cross bar 70 is welded at its ends to the rear ends of the side bars 65, and this rear cross bar 70 has a rearwardly offset central part 73 designed to provide space for accommodating the rubber springs 25 is hereinafter described.

Within each corner of the subframe 55 of the seat part is welded a U-shaped bracket 75, these brackets being arranged with their back parts against the side bars 65 of the subframe and with one side against the corresponding front or rear cross bar 62 or 70. These brackets 75 carry horizontal pivot pins 76, the pivot pins 76 at each side of the seating structure being in axial alinement with each other. Each pivot pin 76 is pivotally connected with a shackle 78, these shackles, in the unloaded position of the seat structure illustrated in full lines in the drawings, extending upwardly and inwardly, and in the maximum load or bottomed position of the seat structure, shown by dot-dash lines in Fig. 7 extending upwardly and outwardly from the seat part. It will be noted that the end 77 of each shackle extends a substantial distance beyond its pivot pin 75 thereby to provide a stop at each corner of the seat structure. Thus the seat is biased upwardly, the ends 77 of the shackles 78 serving as the stops for limiting this upward movement and hence determining the maximum unloaded seat height to be that shown in full lines.

At each side of the seat structure, the other ends of each pair of shackles pivotally connect with a fore-and-aft rod 79. The rear end of each rod 79 is welded or otherwise fixedly and rigidly connected to the outer end of a rear crank arm 80. The front end of end rod 79 is welded to the outer end of a front crank arm 80a. The opposite or fulcrum end of each rear crank arm 80 is secured to the disk 32 of a corresponding rubber torsion spring 25. For this purpose each rear crank arm 80 is provided with a bore 81 through which the corresponding pin 22 extends and each disc 32 carries a pair of pins 82, the heads of which are embedded in the rubber body 26 and the shanks of which extend through the disc 32 and through openings provided in the rear crank arm 80. Each rear crank arm 80 is made in the form of a flat bar to fit against its disc 32 in face-to-face relation and a washer 83 is interposed between each rear crank arm 80 and the corrugation or rib 19 and preferably welded to the crank arm 80 to provide a hub therefor.

At the front of the seating structure each front crank arm 80a swings about the corresponding pivot pin 52, these pivot pins, as previously explained, being in axial alinement with the rubber springs 25.

To prevent sidewise tipping or lurching of the seat part, each pair of rear crank arms 80 are interconnected so as to oscillate in unison, this also compelling the front crank arms 80a to oscillate in unison. The connection between these crank arms on opposite lateral sides of the seat structure is shown as being in the form of a link 85 pivotally connected at its opposite ends to the metal disks 32 of the two rubber springs 25. For this purpose each of these metal disks 32 has mounted therein a pin 86, the stem of which projects forwardly and the head of which is embedded in the rubber body 26 in the same manner as with the pins 82. The link 85 has an opening at each end through which the pin 86 extends, and the link bears against the corrugation or rib 19 to prevent it from slipping off the ends of the pins 86.

The top frame 56 is shown as including front and rear angle irons 90, with flanges 91 extending upwardly, and side channel irons 92 welded at their ends to the ends of the front and rear angle irons 90 and arranged with their upper and lower flanges 93 and 94 opposing one another. The lower flanges 94 are arranged to fit in the track grooves 69 of the side bars 65 of the subframe 55 so that the top frame 56 can be moved fore and aft with respect to the subframe 55. Anchoring means (not shown) of any suitable form can be provided for holding the top frame 56 in any fore-and-aft position with reference to the subframe 55 so that the seat structure can be adjusted fore-and-aft to suit the size of the occupant, The arms 58 are in the form of a single tube having flattened ends 95 welded to the side channels 92 and extending upwardly and thence rearwardly to provide the arms 58. The arms 58 thence continue upwardly and are connected by a cross tube 96. To this cross tube is welded the upper edge of the back plate 59, this back plate being T-shaped in elevation and having its lower part welded to the upstanding flange 91 of the rear cross bar 90 of the top frame 56.

The back cushion 60 can be secured to the upper part of the back plate 59 in any suitable manner. The top frame of the seat structure is completed by the seat cushion 61 which can be of any suitable form to have a rigid bottom fitting between the upstanding flanges 91, 91 of the front and rear cross bars 90, 90 and the arms 58 of the top frame 56. The seat cushion 61 can be directly lifted from its operative position as illustrated in Fig. 1 so as to permit access to the battery or other contents of the box 10.

To permit of ready adjustment of both the rubber springs 25 to have the same initial degree of wind-up to suit the weight of any particular driver, these rubber springs are preferably interconnected by an adjusting mechanism constructed as follows:

The numeral 98 represents a swivel pin mounted on the depending flange 34 of the convex metal anchoring plate 33 of each rubber spring 25 these swivel pins being mounted to rotate about a horizontal axis. These swivel pins are held in position by drive pins 99 or in any other suitable manner and each has a head in the form of a nut 100 disposed against the front face of this flange 34 as best shown in Fig. 6. In these nuts 100 are screwed a threaded adjusting rod 101, this rod having a handle 102. The threads 103 at one end of this adjusting rod and engaging the corresponding swivel pin head or nut 100 are pitched in the opposite direction from the threads 104 at the opposite end of this rod. Accordingly, upon turning the threaded rod 101, the swivel pins 98 are adjusted toward or from each other thereby to rotate the convex anchoring plates 33 of the two rubber springs 25 in opposite directions and establish an initial equal degree of wind-up for the two rubber springs if at this time the seat part 55, 56, 61 is unoccupied, this seat is biased upwardly its maximum extent, this being determined by engagement of the extended ends 77 of the wedge shackles 78 with the cross parts of the brackets 75 in which these shackles are pivoted. Therefore, if the seat is unoccupied while the windup of the rubber springs is being adjusted by so adjusting the position of the anchor plates 33, the opposite disks 32 of these rubber springs are held stationary since they are fast to the crank arms 80 which in turn are pivoted to the shackles so being held against their attaching brackets 75. Accordingly, when the seat is unoccupied the only effect of turning the adjusting screw 101 is to adjust the degree of the wind-up of the rubber bodies 26 by turning the anchor plates 32 of these bodies, their opposite plates 32 being held stationary. Of course, if the seat is occupied turning the adjusting screws 101 to increase the wind-up of the rubber bodies 26 will raise the occupant slightly and turning the adjusting screw 101 in the opposite direction will lower the occupant slightly. In either event, the degree of adjustment is indicated upon the calibrations 44 of the scale on the back plate 43, one of the swivel pins 98 traversing the scale as indicated in Fig. 7.

To cushion the vertical movement of the seat part 55, 56, 61 of the seat structure, either against upward or downward movement, or both, a hydraulic shock absorber, indicated generally at 105, is provided. This shock absorber is shown as being of the telescopic type having a cylindrical body 106 provided with an open end into which a plunger 108 is slidingly fitted. The shock absorber is preferably of the hydraulic type and the body part 106 is shown as being pivoted to a pivot pin 109 projecting forwardly from the central part of the front cross bar 62 of the subframe 55 of the seat part of the seat structure. The plunger 108 is secured by a pivot pin 110 to the lower end of a bracket 111. The upper end of this bracket is secured to the front mounting plate 45 in any suitable manner, as by welding. It will be seen that by this selection of a suitable shock absorber the vertical movement of the seat part 55, 56, 61 with reference to the base part 10 can be controlled and that since the shock absorber is of the telescopic type and is at the front center of the seat structure it does not set up any unbalancing forces. It will also be seen that being between the legs of the occupant it does not interfere in any way with the movement of the occupant even when the top frame 56 and seat cushion 61 are adjusted rearwardly to the maximum extent upon the subframe 55.

The suspension bottoms against a pair of rubber cushions 112 secured to the underside of the seat cushion 61 at opposite sides thereof to engage the tops of the side walls 12 of the battery box 10 and provide a final stop to the seat movement.

Assuming the unloaded position of the seat structure as illustrated in full lines in the drawings, the weight of the occupant upon the seat cushion 61, and any subsequent dynamic upward movement of the tractor, tends to move the seat part downwardly toward the extreme or bottomed position illustrated by dot-dash lines in Fig. 7. Such movement of the tractor, through the battery or tool box 10, moves the rear mounting plate 16 upwardly, thereby to move the rubber springs 25 mounted on the pins 22 upwardly. Such upward movement of the box 10, through the front mounting plate 45, moves the front pivot pins 52 upwardly. Accordingly, the fulcrum ends of the crank arms 80, 80a are moved upwardly with respect to their outer ends which are attached through the shackles 78 to the subframe 55 of the seat part 55, 56 and 61 of the seat structure.

This oscillation of each pair of crank arms 80, 80a is resisted by the corresponding rubber spring 25, this movement of each of these crank arms being transmitted through the pins 82 to the disk 32 vulcanized to forward face 28 of the rubber body 26 of each rubber spring. The rear end of each rubber body 26 is vulcanized to the convex anchoring plate 33, and hence the force so imposed on each rubber body is transmitted to the downwardly projecting ears 34 of these convex metal anchoring plates 33. These two ears 34 are adjustably connected together by their swivel pins 98 and the reversely threaded screw 101 and hence it will be seen that these connected ears 34 provide a non-rotating anchorage for the rear ends of the rubber springs. When it is desired to increase the initial tension or windup of the rubber springs, the reversely threaded rod 101 is turned, through its handle 102, in a corresponding direction. In so turning, the corresponding swivel pin 101 is caused to traverse the graduations 44 on the plate 43. These graduations are preferably calibrated in accordance with the weights of different drivers. Accordingly, the driver can preadjust this seat to his own weight by turning the handle 102 until the pointer formed by one of the pivot pins 98 registers approximately with his weight. This adjustment is preferably made before he sits upon the seat structure, although this adjustment can be made, of course, while the driver is seated upon the seat structure.

Lateral tipping of the seat part 55, 56, 61 is prevented by the link 85 interconnecting the disks 32 of the two rubber springs 25. This link pivotally connects the disks 32 of these two rubber springs to rotate in unison and since these plates 32 are fixed to the two crank arms 80 by the pins 82 this link compels the two crank arms 80 to oscillate in unison. It will be noted that by the positioning of the link 85 as shown, the swinging movement of one crank arm 80 can occur only when there is a corresponding movement of the other crank arm. At the same time, the seat part 55, 56, 61 is capable of limited lateral movement by virtue of the shackles 78 which, however, yieldingly hold the seat part 55, 56, 61 of the seat structure in centered relation to the base part or bodies 10.

When the base part or box 10 is forced upwardly relative to the seat part 55, 56, 61, the effective opposing force of the rubber torsion springs 25 increases at a geometric rate and not at an arithmetic rate. In this particular case the geometric rate is of the accelerated increase type in which increments of vertical movement of the base part 10 are opposed by an accelerated rate of resilient resistance. This is primarily due to the progressive decrease in the effective leverage of the crank arms 80 as they swing about their axes of rotation from their normal static loaded position. This action is also influenced by the varying angularity of the shackles 78 and the fact that increments of vertical displacement of the pivot pins 76 cause acelerated rates of increase in the angular displacement of the rubber torsion springs 25. This latter is due to the fact that increments of vertical movement of the pivot pins 76 are not proportional to the accompanying increments of angular twist to which the rubber torsion springs 25 are subjected.

This geometric action also occurs when the base part 10 of the seat structure moves downwardly relative to the seat part 55, 56, 61. Throughout this particular movement the geometric action is of the accelerated decrease type, that is, as the base part 10 passes through increments of downward movement the rate of decrease of the resilient force tending to push the seat part 55, 56, 61 downwardly decreases.

By this means, so far as vertical forces are concerned, the seat part 55, 56, 61 is free to float along solely under the influence of gravity (plus whatever vertical momentum forces are present), this feature being of particular significance when it is realized that the occupant is also, at the time, solely under the influence of gravity (plus whatever vertical momentum forces are present). The consequence is that within this particular range of movement the occupant of the seat moves vertically up and down with the same acceleration and deceleration as the seat and hence without changing the pressure between the occupant and the seat. Such a desirable result is quite different from that obtained from conventional seat suspensions in which the vehicle drags or jerks the seat down whenever the strains imposed on the seat are negative. With the present suspension no such dragging forces tending to pull the seat downwardly are possible.

The movement of the seat part 55, 56, 61 relative to the base part 10 is also cushioned by the hydraulic shock absorber 105. It will be noted that this shock absorber is pivoted to the center of the front cross bar 62 of the subframe 55 and has its opposite lower end anchored in the bracket 111 attached to the front of the base part or box 10. By this arrangement the shock absorber is centered with respect to the linkage of the suspension means so as not to impose any eccentric forces upon the seat structure and at the same time is located between the legs of the occupant so as not to interfere with the occupant even when the top frame 56 is moved in its extreme rearward position with reference to the subframe 55.

It will be particularly noted that when the seat cushion 61 is lifted from the top frame 56, the contents of the box 10 are fully accessible for removing or replacing the contents thereof, such as a battery. It will further be noted that the front, rear and side bars, 62, 70, and 65 of the subframe are in closely spaced relation to the corresponding front, rear and side walls 13, 14, and 12 of the box 10 and at the same time are spaced sufficiently far apart so as to avoid any danger of pinching one's fingers if one's hand is carelessly brought under the seat part while riding along. It will also particularly be noted that in the action of the seat structure the rods 79 at the outer ends of the crank arms 80 and which connect with the shackles 78 swing downwardly along the outer sides of the end walls 12 of the box 10 in closely spaced relation both to these end walls 12 and also to the side bars 65 of the subframe 55. Accordingly, with a minimum horizontal size and with a minimum elevation of the seat part 55, 56, 61 from the base part 10 maximum vertical movement is provided for the seat part 55, 56, 61 with the suspension means arranged principally along the exterior of the box 10 and providing substantially full movement from the top of the box 10 to the bottom of the seat cushion 61.

It will also be noted that the present invention provides resilient support for the seat part 55, 56, 61 in the form of simple and sturdy rubber torsion springs which can be produced at low cost and secured both to the base part 10 of the seat structure and also to the rear crank arms 80 of the suspension means in a simple and effective manner and in a position where they are readily accessible and adjustable. Further, the suspension means as a whole can be readily designed to have any desired characteristics within an operative range. Thus, any desired resistance curve can be obtained by making the crank arms 80, 80a of a corresponding length and any desired frequency can be obtained by selecting a rubber spring 25 of such diameter as to provide the angular crank arm movement to provide such desired frequency. The use of the rubber springs 25 in the form shown and in relation to the crank arms 80, shackles 78 and base part pivots 76 provides the ability to produce any desired spring rate and resistance curve in a very simple and inexpensive seat suspension.

It will also be seen that full advantage is taken throughout of simple and inexpensive welded joints and that at the same time the suspension can be taken apart in the form of simple subassemblies which can be replaced at low cost.

From the foregoing it will be seen that the present invention provides an improved seat suspension which is particularly applicable to rough riding vehicles and provides controlled cushioning in such manner as to produce the maximum safety and comfort and leave the occupant in full control of all control levers and wheels. The suspension is also particularly applicable where the occupant must be seated directly over a battery box or the like to which convenient access must be had for removing or replacing the battery. The suspension is also simple, rugged and not subject to break down or loss of utility and can be produced at low cost and accomplishes the specific objectives enumerated in a simple and efficient manner.

We claim:

A seat structure mounted on a box from the interior of which the parts of the seat structure must be excluded, comprising a vertical rear mounting plate attached to the exterior of the vertical rear wall of the box, a vertical front mounting plate attached to the exterior of the vertical front wall of said box, a pair of parallel horizontally spaced pins fixed to said rear mounting plate and projecting rearwardly therefrom in the same horizontal plane, a pair of pins severally in axial alinement with said first pair of pins and projecting forwardly from said front mounting plate, a crank arm fulcrumed on each of said pins, a fore-and-aft rod fixed to and rigidly connecting the outboard ends of each pair of crank arms mounted on coaxial pivot pins, a horizontal rectangular seat frame capable of moving downwardly and into embracing relation with the side walls of said box, shackles connecting said rods with the corresponding sides of said seat frame, and a rubber body anchored on each pin of one mounting plate and operatively connected to the corresponding crank arm and yieldingly resisting vertical movement thereof.

(References on following page)

References Cited in the file of this patent

UNITED STATES PATENTS

| | | |
|---|---|---|
| 208,083 | Gorrell | Sept. 17, 1878 |
| 521,463 | Smith-Fraser | June 19, 1894 |
| 1,569,670 | Palmer | Jan. 12, 1926 |
| 2,500,496 | Nickelsen et al. | Mar. 14, 1950 |
| 2,590,859 | Hickman | Apr. 1, 1952 |
| 2,628,657 | Orrick | Feb. 17, 1953 |
| 2,681,686 | Sheron | June 22, 1954 |
| 2,685,913 | Schlueter | Aug. 10, 1954 |
| 2,691,406 | Hickman | Oct. 12, 1954 |